United States Patent [19]

Orenshteyn

[11] Patent Number: 5,889,942
[45] Date of Patent: Mar. 30, 1999

[54] SECURED SYSTEM FOR ACCESSING APPLICATION SERVICES FROM A REMOTE STATION

[76] Inventor: Alexander S. Orenshteyn, Sinectonalysis, Inc., Suite g-12 #189, 3702 S. Virginia St., Reno, Nev. 89502

[21] Appl. No.: 769,493

[22] Filed: Dec. 18, 1996

[51] Int. Cl.[6] .................................................. G01F 11/00
[52] U.S. Cl. ............................... 395/187.01; 395/200.33; 395/200.59
[58] Field of Search ............................. 395/187.07, 186, 395/188.01, 200.59, 200.48, 200.33, 200.43, 200.49, 200.57; 280/4, 24, 25; 707/9

[56] References Cited

U.S. PATENT DOCUMENTS

| | | | |
|---|---|---|---|
| 5,572,643 | 11/1996 | Judson | 395/200.48 |
| 5,596,714 | 1/1997 | Connell | 395/183.14 |
| 5,642,515 | 6/1997 | Jones et al. | 395/182.03 |

*Primary Examiner*—Robert W. Beausoliel, Jr.
*Assistant Examiner*—Pierre E. Elisca

[57] ABSTRACT

A secured system is provided for accessing application services running on a remote server from a client station. The system includes at least one client station, each having low-level graphical interface and file logic stored therein and at least one controller, such as a digital signal processor. The controller controls the graphical interface and the file logic. The file logic includes a file system capable of storing data corresponding to the application programs. Further, the system includes at least one remote application server, each server having high-level application logic for running corresponding application programs stored locally or remotely. In addition, a low-level interface connects each client and server. In this system, the cost of manufacturing such clients are far less expensive but far more robust than conventional general purpose computers. Further, the server application programs need not be written specific to or be dependent on any specific operating system platform.

62 Claims, 4 Drawing Sheets

SECURED SYSTEM FOR ACCESSING APPLICATION SERVICES FROM A REMOTE STATION

FIELD OF THE INVENTION

The invention relates generally to a reciprocal client-server network system and, more particularly, to a secured system and method for obtaining application services (i.e., embedded services/applications) from a server and for delivering such services to the requesting client/desktop device, where the service's application logic (high-level presentation, business and database logic) is independent from the client's low-level operating system and I/O peripheral devices.

BACKGROUND OF THE INVENTION

As we are looking forward to year 2000 and beyond, a question arises. How will computing look in the future? The trends we have seen are obvious; more powerful chips are being released every few months, while software development struggles to keep up with the hardware but never does. Of course, we now have a slightly new twist, i.e. the new found popularity of internet, the web, and Java® code (developed by SUN®). For instance, with respect to the web, typically a server downloads code (e.g. graphics, Java applets) to a general purpose computer, and the computer's browser software interprets the codes for display. However, interpreting and downloading the code takes significant time.

Some have said that Java (being platform independent) has finally brought a tool to the computer market to break the major chip and operating system (OS) dominance which have developed in the desktop industry, via Intel® and Microsoft®, respectively. However, different software vendors are creating their own Java extensions, such that Java is losing its portability. For example, Microsoft has developed its own Java interpreter, MS J++® with extensions specific to the Microsoft web browser Explorer® and other related Microsoft technology, such as Active-X®.

Further, we have seen neither Intel nor Microsoft despair about web development, i.e., they do not see the currently available internet technologies as able to threaten their respective monopolies, as "Intel Inside" will continue to power general purpose PCs and Microsoft's OSs will continue to manage them, while its Microsoft web-browser Explorer® now supports Java code. Further, Microsoft's proprietary Active-X technology is a Java competitor which may yet derail the industry's effort to use open standards. Accordingly, Intel's and Microsoft's dominance remains the same.

It has been predicted that computing, especially network computing, will change so drastically in the near future that no company/vendor would be able to dominate any market but the current efforts by many software vendors to "extend" the Java standards is putting that prediction in doubt. As Java applets get developed, incorporating non-standard extensions will eventually cause the emergence of another yet another dominant Java applet supplier. At this point, there is little doubt it is going to be the current software giant Microsoft. By modifying its proprietary operating systems, like Windows 96 and Windows NT to more effectively process either Java applets or Active-X objects, Microsoft once again will dominate software application development.

General purpose computing on the desktop, i.e., desktops having a standard OS (such as Windows 95®) and a microprocessor (such as the Pentium® chip), has to be replaced by a system which is less expensive to own and maintain but at the same time does not short-change the user by taking away features which we all have come to expect from our PCs, such as flexibility, extendibility, high-security, ease-of-use, and reasonable cost of initial ownership to enable the software and hardware industry to proceed forward in new and creative ways.

Foreseeable disadvantages of the standard general purpose PC, with respect to the networks and Java, include the following. Java applications will increase in complexity, therefore requiring faster processors and greater memory in the desktop unit to run them (the same problem which PCs have always had) again forcing the user into a never-ending spiral of hardware and software upgrades. Currently, Java applets are four to five times slower than compiled code, requiring more powerful processors to get similar performance as compared to an application that runs native binary code. Further, converting applications from another high-level language to Java (or even from C++) is a very expensive, labor-intensive effort, so that it is no wonder that legacy COBOL applications are still often used in business.

It is also a concern that the computer's writable resources, e.g. a hard drive, can be compromised or damaged by rogue Java applets. On the other hand, if the computer has no writable resources, then the user typically keeps his or her files in remote locations, e.g. on a remote file server, thereby making the user's data files a security risk which no company can afford. An example of a computer having no writable resources is the proposed Network Computer "NC" (a joint effort by Apple®, Netscape®, IBM®, Oracle® and SUN®).

Figure 1:
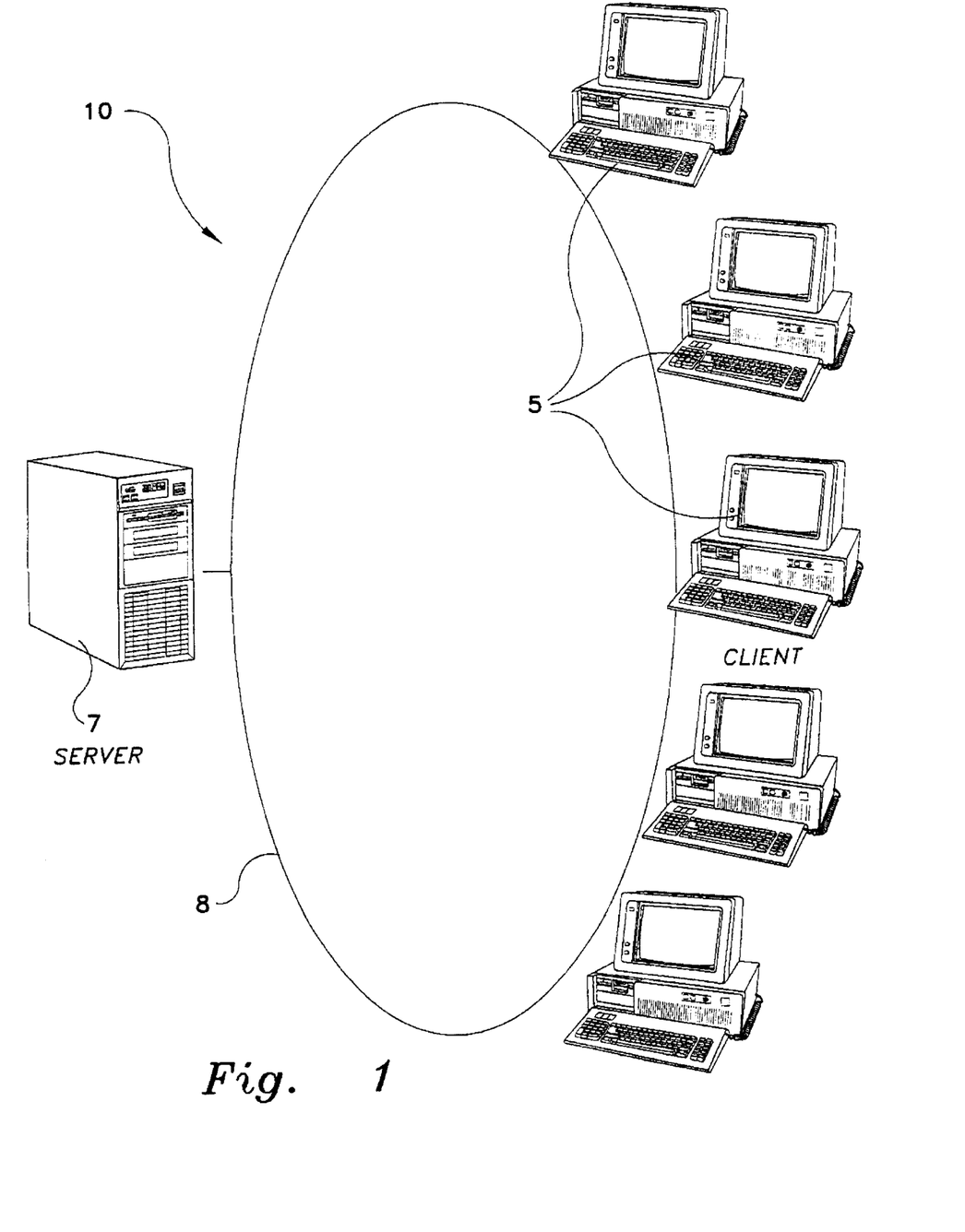
FIG. 1 schematically illustrates a two-tier network having a server, transmission medium and a plurality of clients.

A typical network system having server-client architecture, which can be utilized in the present invention, is illustrated in FIG. 1. In FIG. 1, network 10 includes a central server 7 connected to a plurality of clients 5 over a shared transmission medium 8. Network 10 is applicable to supporting the transmission of data on a local area network (LAN) or on a wide area network (WAN).

A typical server 7 may vary substantially in its architecture. It may be a unior multi-processor machine, a PC or a mainframe, a workstation from a major manufacturer or a proprietary technology based computer, etc. It may even be a special function device without any OS or software. Server 7 should be able, however, to function in a predefined way or to run whatever software that the company which owns the server needs to run on it. It should also be able to comply with standard transport protocol, such as tcp/ip used by the internet or other transport protocols used on wireless or wired LANs.

Server 7 may have its own file system for storing service-related files and data or server 7 may strictly be a computational server whose software is loaded from the file system of another server, i.e., a file server or file system of super-client (neither shown), which is preferable for security reasons. If the computational server runs the booted programs solely from RAM, then it would not have access to its local file system after the software is loaded into its main memory (RAM).

FIG. 1 illustrates the so called two-tier computing configuration. In addition, a three- or N-tier computing configuration may also be utilized, as will be discussed hereinlater.

Conventionally, in a first major configuration, the client stations 5 are essentially "dumb" terminals connected to a central server 7 via transmission medium 8. The central server contains the client users' data and the application/ program code. Further, the central server executes all the programs for its clients 5.

Substantially all of the application logic (i.e., presentation logic, business logic, and database logic) is resident within the central server. Such application logic (presentation, business, database) includes any program logic concerned with delivering and/or executing the application service. Note, however, that each client may harbor some low-level graphical interface logic such as X11 protocol. These clients are diskless and perform no general computational tasks. Further, the database (file system) logic on the server is shared among the clients. An example of such a system is a set of X-terminals attached to a central server.

In a second major configuration, the central server 7 contains both the program code and the file system which the clients use, as with the first configuration, but does not execute any applications. Instead, the applications are downloaded into each requesting client 5 through the network and run on each client. The client, however, continues using the central server as the client database/file system source. The clients in this configuration are usually diskless but do contain powerful CPUs, such as by SPARC®, MIPS® and ALPHA®. Although all of the presentation, business and database logic (while running) reside on the client, the file system is located on the central server and is shared among the clients. An example of the second configuration include a LAN with a central database such as ORACLE, Informix or Sybase running on an IBM AS/100 file server and set of diskless desktop machines like SUN or RS6000 workstations using a central file server to get their program code and data.

Further, the proposed NC is similar to the second configuration, except that instead of loading native machine code onto a client, Java code is sent to be either interpreted or compiled on-the-fly into native code at the client station. That is, the Java code is either interpreted by the browser software on the client or the browser first compiles the Java code, then runs it. The obvious problems with this solution are that interpreted code and compilation is slow, and as the complexity of Java code increases, the CPU/memory combination of the NC or general purpose PC/browser combination would also have to increase in computational power and memory size to accommodate the growth. Further, Java code would arrive to the desktop in source form making it very difficult to determine whether malfunctions or bugs are associated with the Java applet or the browser software itself.

In addition, since the Java code is supplied to run on the client, an application foreign to the client is accepted which may potentially damage the PC's writable resources by malice or mistake (e.g., by utilizing security holes in the browsers). Further, the NC fails to protect the user's private data from other clients since it lacks local storage and all client data has to reside in a central location. Java also makes copyright enforcement an extremely difficult task for the software vendors. Since Java applets have absolutely no protection from being copied by the client/user machine, as they are delivered in source form.

In a third configuration, a three- or N-tier computing network is employed. Such a configuration is currently being utilized by Forte Technologies. They offer programming tools to decompose client-server applications into presentation logic which runs on each client 5, business logic which runs on the central server 7 and database logic which runs on a file server (not shown). However, the business and database logic may run on the same physical server. As with the first and second configurations, the client's database/file system logic is stored remotely from the client, as it is shared among the clients, and thus poses a security risk. Since the presentation logic runs on the client, this system is also faced with the problem of constant upgrades and high maintenance costs of the client stations. Another great problem in this model is that application codes have to be written specifically to one software vendor's implementation of the N-tier network and a user is typically forced to license and distribute parts of the system to run his own applications.

It is therefore an object of the present invention to overcome the disadvantages of the prior art.

SUMMARY OF THE INVENTION

This and other objects are realized by an inventive system and method of accessing application services from selected application programs, stored and run on a remote compute-server, while the application program utilizes the client's operating-system-level services such as storage devices for its permanent storage requirements. A selected remote server uses the client as a peripheral device for the purpose of I/O interfacing to the client's keyboard, mouse, monitor, file system or any other client-attached peripheral device and for controlling those attached devices.

In particular, the system includes at least one client station, each having low-level graphical interface (e.g., a graphical user interface (GUI)) and file I/O logic stored therein and at least one controller circuit (e.g., a digital signal processor (DSP)) for controlling the client's I/O peripheral devices. The file I/O logic is capable of storing and retrieving data corresponding to the application programs and otherwise perform low-level file control operations on the file system and specifically on the device files. Further, the controller operates the graphical interface and file I/O logic.

In addition, the system includes at least one specialized remote application server. Each server includes high-level application logic stored therein for running the corresponding application program or stored in a corresponding file server. A low-level interface (e.g., an operating system service interface (OSSI)) establishes a common protocol for connecting each client to each server. OSSI protocol insulates high-level application logic from direct access to the underlying operating system, thus allowing a high-level application to obtain OSSI services from different operating systems or from special console devices which understand OSSI protocol. OSSI makes it possible for a high-level application to use OS-level services on a remote client separated by a network.

In operation, upon initiation by a client, a selected server spawns a selected application running thereon and selectively accesses the file system and the corresponding data of the requesting client. Thus, the client acts as a peripheral device (a "window on the world") for the selected service application running remotely on the server. In turn, the remote server processes the corresponding data from the client (and on behalf of the client) through the spawned service application without permanently storing the data within the server. In other words, the client serves file systems, screen, keyboards, mouse, other attached devices to a server, while the server serves to the client application logic and compute-power.

In addition, a "directory" service application may be used which resides on the server such that the client may launch the selected application via the directory service. "Directory" service applications may perform small services directly (e.g., display some textual or graphical information), refer to another service application on the same server, or reference an application service on another server. In this manner, multiple directory services may be chained together so that the client user can reference multiple applications by different vendors, residing on different servers. By chaining "directory" service applications in the above manner, a network of various application services can be readily available to the client. An user can "roam" the network of "directory" services until he/she finds the appropriate application for his task. In addition, search engines could also be employed. Once found, an application internet address and port can be recorded for future use in the client configuration database/file.

The applications on the remote servers are not dependent on, and thus preferably not written for, any specific client OS. Thus, the application logic is separated from the client's low-level "quasi" OS logic. In other words, the application does not link directly with the client's kernel-level services (of the OS) to perform the desired functions. Instead, the application prepares a desired "command packet" (representing the desired function and necessary data) by calling an appropriate command function from the server's function library. The command function from the server's library encodes the command packet according to OSSI protocol. The command packet is then dispatched to the client's quasi-OS via the common transport protocol (such as tcp/ip). The client's quasi-OS can recognize the received, OSSI encoded, packets for performing the desired I/O or control operations.

Further, the quasi-OS has the flexibility to tailor its action in response to a specific "command packet" according to its own abilities or to the abilities of the devices to which it has access. Therefore, specific logical commands from an application may be executed differently depending on in what environment the quasi-OS exists. If X11 is used for the GUI, then the application will look and feel like an "X" application. Similarly, if another GUI is used (e.g., Windows 95), then the application will look and feel like a Windows 95 application.

This invention differs from all three models, discussed above, in the following major ways. The invention enables selected, i.e., restricted, access from the application on the remote server to the client's permanent storage facilities, such as the hard drives, CD-ROM drives, tape drives, floppy drives, and any other I/O or other device which may be attached to the client. In other words, the remote servers perform operations on the client's local data and devices. Thus, the server can process the data from the client; however, the data never resides permanently on the server. Local data is simply read from or written to the client file system as required by the application logic.

All of the above conventional models employ a centralized file system on the server, so that the file system is shared between the clients. Accordingly, a rogue client can gain unauthorized access to another client's data through the shared file system. The present invention, however, does not share a file system among different clients but store client's data in the attached storage devices such that they are inaccessible (without explicit authorization from the user) to other clients or servers.

Further, in the present invention, if more than one client spawns the same application during the same time period, then each client can make certain files accessible by the application on the server at the same time which, if the application permits, may enable distributed cooperative projects between consenting clients.

Illustratively, the invention prohibits running substantially any application logic on the client. The second configuration executes all application logic on the client side, while the third configuration executes high-level presentation and business logic on the client. Further, the application depends on a high-level interface between the client and server parts of the application, and a predetermined platform compatibility.

Since the present invention removes all application logic from the client, there is no longer any need to execute any general purpose code on the client. The remote servers are wholly dependent on the connected clients to serve the client's I/O peripheral devices, therefore the servers do not need any hardware devices of their own to get the I/O services which the clients can provide. Therefore, expensive general purpose processing CPUs are preferably replaced with inexpensive but powerful controllers, such as DSP chips. Despite the fact that the present invention does not have any application logic on the client, it feels in its use like a general purpose PC that runs the application program directly on the PC. The inventive client allows the client user to keep his or her private data on their own disk, and it can have all the common I/O devices attached to it, such as CD-ROM and floppy drives, as well as other peripherals such as printers, plotters and the like.

Another major weakness of the above three configurations is the centralized database/file systems. Giving access to a server's central file system may be a workable solution in the corporate internet environment, where every user is known (although it is also known that many security breaches are orchestrated by insiders) and can be tracked, but fails completely in the anonymous environment of the internet. The present invention does not suffer from the same drawback. Since the server application always utilizes the file system on the client, the client has no access to the server's file system at all and therefore, can do no damage either through malice or mistake. The client merely connects to a port on the server and can typically only view whether the server is accepting its requests for services (via an application). In addition, the server (a compute-server) may not have a file system at all to be damaged but instead, may boot the appropriate application from another server (e.g., a corresponding file server or super-client). In such a case, the file server may disconnect from the compute-server, while the application runs within the compute-server's RAM.

Another advantage of having the file I/O logic locally on the client is that every client can insure the integrity of its data with backups and the like. This eliminates a lot of problems for service providers who would otherwise be responsible for keeping the client's program data safe from corruption or intrusion by third parties. One can easily see that in the internet arena, it is simply impossible to accommodate unlimited numbers of users because of simple limitations like disk space in the server. In the present invention, however, only the computational resources are shared, so many more users can be accommodated. Further, by having a compute-server access local file systems, the performance of the server is also improved since typically the file I/O in centralized file systems is the "bottle-neck" for (i.e., reduces) computational performance. Since in this invention the server sees multiple file systems on different clients, there is no competition for the limited storage resources by different clients or applications.

Further, the application service can be delivered to a new user instantly, instead of having to set up either security groups or user IDs. In other words, such security is not necessary (unless for billing purposes) since the client's data can not be accessed without authorization and the server's applications and data can not be copied or damaged as it is never sent to the requesting clients. Further, each client can receive services anonymously since the application data, specific to the client, resides on the client's file system and the clients do not ever gain privileges to access the server file system.

In addition, although the client serves its file system and devices, it is the client which establishes the connection to the servers. There is no mechanism for the servers to obtain a connection to a client unless the client actively is seeking to connect. Therefore, a potential intruder has no way to gain entry into the client's file system. So although the client serves its files, it serves them only to servers to which the client itself connected.

Preferably, the firmware which runs on the client (stored in ROM) in the present invention is not user-modifiable since no general purpose computing will be done locally on the client. Accordingly, expensive power and memory hungry general purpose operating systems (OS) are unnecessary since user programs/processes need not be loaded or managed. Only a small quasi-OS is required to be stored in the firmware, such that the authorized server can control all of the client I/O and file system. For example, the graphical user interface, controlled by the quasi-OS, may be based on the X11 protocol, which is in the public domain.

Since neither conventional general purpose CPUs nor OSs are required in the present invention, a client becomes a long term investment for the consumer since such client stations could operate adequately for ten years or longer. On the other hand, since the second and third conventional configurations have either all or part of the business/application logic residing on the client, the user is invariably forced to upgrade the system to run more complex and fatter applications.

In addition, with respect to the server, the present invention preferably curtails common services like telnet, ftp, rsh, rlogin. The server is therefore left with specialized application services which do not allow access to command shells. This creates a very secure system that is substantially impervious to outside attack, yet flexible enough to offer services to the anonymous masses of the internet.

Lastly, in the present invention, an application program need be developed only once. After the most appropriate hardware is chosen for the server (it could be designed specifically for the application), the application is developed and, instead of selling the software to run on different platforms, the application need only be set up as a service having a common internet protocol, such as tcp (or udp)/ip, and attached to a network. Since the client contains no application specific logic, any application could use the client for display and file services. The client's quasi-OS has the flexibility to interpret the command packets received from the connected server according to its local capabilities, so that if the client has a text-only display, then the quasi-OS will display information in a text mode. If X11 is used, then X functionality would be employed. However, if Windows is the underlying OS, then Windows facilities would be utilized. The look, feel and capabilities of any application will be adapting to the look, feel and capabilities of quasi-OS. At the same time, the general behavior of quasi-OS would be controlled by the service applications.

The client's quasi-OS and the application would be in a symbiotic relationship the application tells the quasi-OS what to do, and the quasi-OS determines how it should be done. While the quasi-OS does not have any useful function or behavior of its own without the applications, the applications are unable to get anything done without the quasi-OS I/O and control services. All the hardware/OS dependent functionality is encapsulated in the "front-end" of the quasi-OS and all the logic/behavior of an application is encapsulated in the application code. The two cooperate with each other through a OSSI communications protocol (which itself uses an underlying transport protocol). Thus, the application never executes any low-level code, instead it "asks" the quasi-OS to perform that operation on its behalf. In other words, the quasi-OS does not perform any operations which have not been requested by a remote application (exception is file maintenance operations when requested by the client user).

Existing applications which already have been written for specific platforms, such as UNIX/X and Windows 95/NT, can be easily converted by using libraries which utilize the OSSI for generating command packets, while maintaining conventional UNIX/X or Windows APIs (application programming interface).

In addition, disk space on the client no longer has to be wasted with hundreds of megabytes of OS files and application code, since only data is stored therein. At the same time, the server do not have to store any user data or make backups. Also, the user no longer has to worry about upgrading his or her software, since this maintenance problem completely passes to the software vendors. Further, upgrading is easy for the software vendors since they need to upgrade only one application per server which they can phase in slowly. With respect to companies wishing to purchase application programs, such companies can purchase the inventive servers having pre-installed service applications which can immediately service hundreds to thousands of clients. Hardware requirements for the servers can now be drastically simplified, since either a CPU (general purpose or specialized) or a special processing chip having the appropriate memory in conjunction with the network interface (hardware and software) create a usable server.

BRIEF DESCRIPTION OF THE DRAWING

The following detailed description, given by way of example and not intended to limit the present invention solely thereto, will best be understood in conjunction with the accompanying drawings in which.

DETAILED DESCRIPTION OF THE INVENTION

Figure 2:
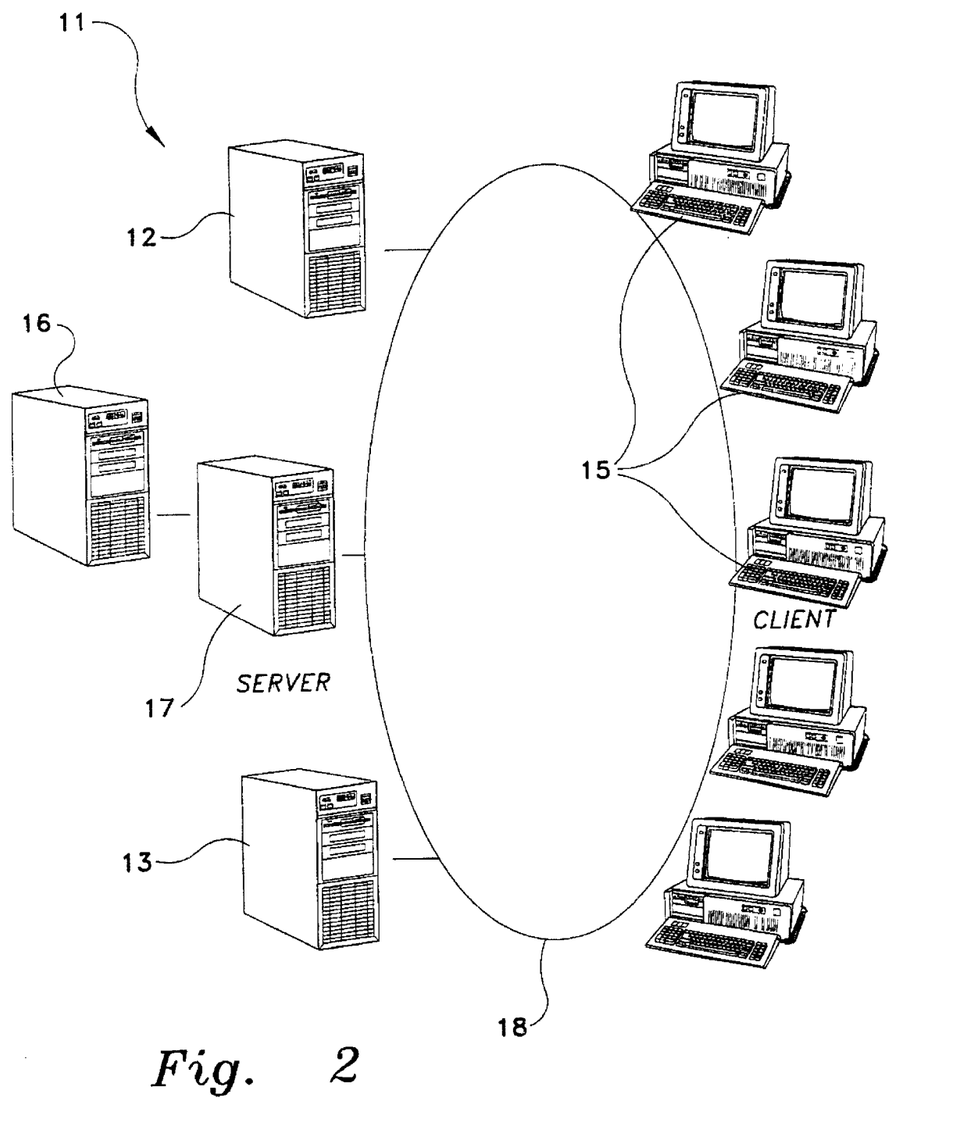
FIG. 2 schematically illustrates a two and three-tier network having a plurality of compute servers, transmission medium and a plurality of clients in accordance with the present invention.

Referring to FIG. 2, the inventive system 11 comprises a plurality of specialized servers 12, 13, 16, 17 connected to a plurality of clients 15 over shared transmission medium 18. As with network 10 of FIG. 1, the system 11 is applicable to supporting the transmission of data on a LAN or WAN system. In general, each client serves its monitor, keyboard, mouse, file system, and other I/O and desktop attached peripheral devices. The servers serve their corresponding compute-power, application logic and control the I/O and other devices of the clients.

Each server is typically supported by an independent vendor to run their software application programs, as desired. For example, server 12 may be supported by vendor A for running word processing applications, while server 13 may be supported by vendor B for running engineering type applications. Further, one server may support service applications from different companies but which run similar applications. That is, server 12, e.g., may be supported by a service provider which will host multiple software vendors' applications relating to spreadsheets. Of course, service applications running on the same server need not be similar at all.

Server 16 is shown connected exclusively to server 17 which acts as a file server. File server 16 stores and boots the selected application program, as instructed by computational server 17. For example, file server 16 may be considered a so-called super-client that injects the selected application to compute-server 17 and then disconnects from server 17. This setup is preferable, as it adds a level of security from a client that connects to server 17 with the intention of corrupting the applications.

Each client 15 is preferably not a general purpose PC but an inexpensive and highly robust data-acquisition device. Thus, a client does not require a conventional CPU, such as a Pentium, PowerPC or Alpha chip. Nor does a client require a conventional OS, such as MS-DOS® or Windows 95. Instead of a conventional general purpose CPU, inexpensive but powerful controller circuits will be utilized for controlling the storage devices and other I/O hardware. An example of a controller is a TI TMS320C4x or C3x DSP chip. The controller or a plurality of controllers will control the client file system (file I/O logic) and low-level graphical interface logic (e.g, GUI). For example, each client may have a separate controller chip for the file system/disk controller block, the communication block and the display/human interface block of the client, or one DSP control may control all three blocks.

Since the functions of the file I/O and graphical interface logic are well-defined and understood and do not have to be changed for different applications, they can be highly optimized in machine language for the highest speed, and will be provided as firmware in the client's ROM, rather than software as is conventional (since conventional OSs are programmable). In fact, most of the functions could be cast in hardware like ASICs. It should be understood that general purpose computers will also work with the present invention (with little or no modifications), such that existing owners of PCs can access any specialized server to spawn a selected application, as desired. In such a case, the quasi-OS is replaced with the front-end "compute-browser" which has to be ported to the general purpose computer's OS (Windows 95/NT, UNIX, OS2, and the like) like any other program and runs as a user process under the regular operating systems mentioned above. This "computebrowser" would then utilize the host OS resources to control local devices on behalf of the remote service applications. Further, non-specialized servers having conventional application programs stored thereon may be utilized via the use of a "directory" service application, while the directory service application would provide the service to the client but may use one or more conventional programs to perform its tasks. Conventional applications can also be easily modified into service applications by recompiling and linking them with new startup code and new I/O and OS libraries.

Referring back to the specialized clients, instead of a conventional OS, a low-level "quasi"-OS, such as one whose graphical user interface is based on the X11 protocol (X11 is in the public domain), modified for data compression and encryption, will be stored in the ROM of each client. The quasi-OS essentially acts as a driver to perform tasks specific to the client hardware, as well as being the basis for the windowing structure. Note that the quasi-OS executes no application logic and can not load or run any client user processes.

Since these specialized clients require no conventional CPU or OS, they are inexpensive to produce and sell, and are far more robust than conventional general purpose Pcs. Since these clients offer a longer useful life than general purpose Pcs, or other desktop workstations, the cost of the client may be amortized over longer periods of times, further decreasing the overall cost of the client. Faster CPUs and extra memory are not required in the specialized clients since even when service applications become more complex, the applications are still run remotely on the corresponding server, instead of being loaded and processed on the client.

Further, since the client contains no specific OS platform, the applications running on the servers only need to be concerned with using a standard internet protocol, such as tcp/ip and OSSI higher-level protocol for the command packets. Thus, the only compatibility required between each client and the server application is file format compatibility. As will be described hereinlater, since the data in the client file system will typically be created by the application itself, compatibility is not a concern.

Now, instead of a software vendor selling different versions of their application programs to run on the different available platforms, only one version is typically resident on a server. Since the applications are compatible with the client file system (in fact, the applications do not need to know the internal structure of the file system since quasi-OS will handle the interface) and the quasi-OS, any specialized application will operate with the client, such that an unlimited number of different applications could be accessed by from each client connected to a server or to multiple servers. The client can serve its peripheral devices to any number of service applications (accordingly to their commands), and to any number of specialized servers.

Such servers can have different hardware architectures without concern for what OS the clients are running or what devices they use. Therefore, software vendors have complete freedom to design machines and software for maximum speed and flexibility. In fact, servers may not run any OS at all but run directly bootable service applications. The software vendors also will not have to deal with compatibility concerns, save tcp(or udp)/ip and X11 protocols. By using OSSI compatible libraries, the software is automatically compatible without any source code modifications.

Each client need only comprise one or more storage devices, such as a hard, floppy, or CD-ROM drive. As stated, each client also comprises a file system. The client storage system may also be separate from the client (not shown) by use, e.g., of an attached file server. If the client does not have any storage device attached, then the only application which can be used is those which require no storage facilities, such as html browsers. The files in the file system includes a configuration file which tells the client quasi-OS where on the network (LAN or WAN/Internet) to connect and to which port to obtain a connection to a specific service application. Further, the file system includes data files storing data corresponding to each previously spawned application, as well as check-point files representing the state of the program when the connection is terminated for each application. The check-point files allow recovery in case of network failure, however, the check-point files need to be encrypted by the server to prevent any tampering by the clients. In addition, the file system temporarily stores any work-space files that the service application may require.

Accordingly, all of the client user's data, corresponding to each spawned application, is stored locally, such that when the client is disconnected from the network, the user's data is incorruptible by anything else on the network. Compare this to systems where the data is stored in a central server file system. In those systems, the data is subject to corruption by malice or mistake.

Further, each client also includes low-level graphical interface logic so that the client user can select which server application to launch. This non-general purpose client performs no high-level logic functions. Preferably, the only functions permitted would include directing the peripheral devices to attach to requesting service applications, making data backups, displaying, and opening, renaming and deleting data files, but would not include any processing of such files. File maintenance operations should be embedded within the quasi-OS and perform only pre-determined well defined tasks. File maintenance operations, built into the quasi-OS, cannot be initiated by any remote service application but rather may only be invoked directly from the quasi-OS by the client user. File maintenance may, however, be performed by the servers to the extent permitted by the quasi-OS without involving its internal maintenance functions.

Each client may optionally contain plug-in I/O modules such as a frame grabber, an audio/video interface, a digital-to-analog and analog-to-digital converter, a microphone, a camera, a compression board, a temperature probe, a humidity probe, an encryption chip, or any other device, as desired. The server then, via the application program, controls the client's I/O devices (as well as the client's file system, etc.) by sending appropriate command packets to the client quasi-OS. Further, as stated, each server may include any specialized hardware for running its applications or services without compatibility concerns with the client.

For example, a movie editing server may include all of the expensive hardware editors connected to the server. A movie studio may then have a client, having a video camera I/O device. The film on the camera can then be edited via the editing hardware on the server without having to purchase their own expensive editing hardware. Thus, the application would control the data feed from the camera, edit the transmitted data on the resident editors, and transmit back the edited data to the client for storage on the client's disk for immediate display on the client's monitor, or for printing on the client's printer or for output to a CD-ROM, a DVD disk or a video tape.

The operation of the inventive system will be described below with reference to the flow chart of FIGS. 3A and 3B. However as a precursor, note that the client acts as a window on the world for the selected application, while the client user selected application runs on the corresponding server. In other words, the client is a "human-machine-interface" (HMI) for the servers. Upon authorization, the application accesses the client's file system to retrieve the user data for processing. Note that the application controls all of the operations and controls all of the peripheral devices on the client, via the quasi-OS.

For example, all of the I/O modules (such as a floppy drive) are controlled remotely by the server application. Once the application is complete or during the run of the application (as data needs to be read or written), the processed data is transmitted to the client file system for local storage on the client. Since the application's program code does not get transmitted to the client (like in Java or Active-X objects), the user cannot copy the code. Accordingly, software vendors can easily go into China, Hong Kong, Korea, Eastern Europe and other markets where software piracy is wide-spread (as high as 98%) and offer these compute services without piracy concerns.

As stated, the inventive system differentiates between data and program code, i.e., the client file system is intended to store only data for the remote server, never their application program code. The program code is loaded into the servers from their own private file system (inaccessible to clients) or from a corresponding file server (whose function is limited to carrying the program boot code but can not run the application) for added security. The only exception to this separation is when executable files are themselves program data as in a situation where the application is a compiler (or linker), but the compiler-server would be cross-compiling for a different architecture. The resulting programs cannot run on the client and should not be run on the compile-server (for security). Rather, the resulting program should be run on a separate execute-server which has the appropriate CPU and software to remotely load and run the program. In general, note that the server that runs the application should be different from the server which created it.

Figure 3A:
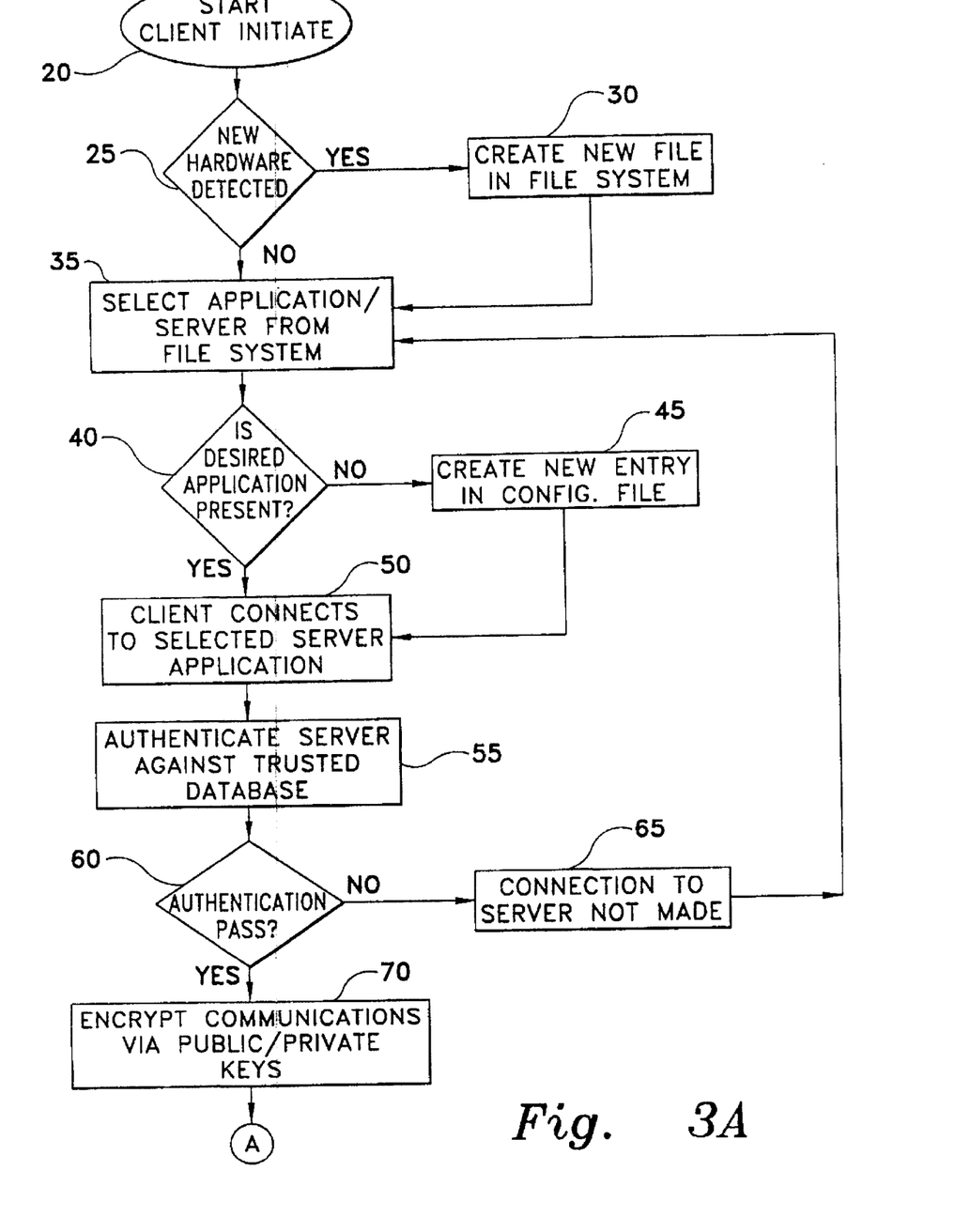
FIGS. 3A and 3B is a flow chart showing the steps for accessing and spawning an application on a server from a remote client.
Figure 3B:
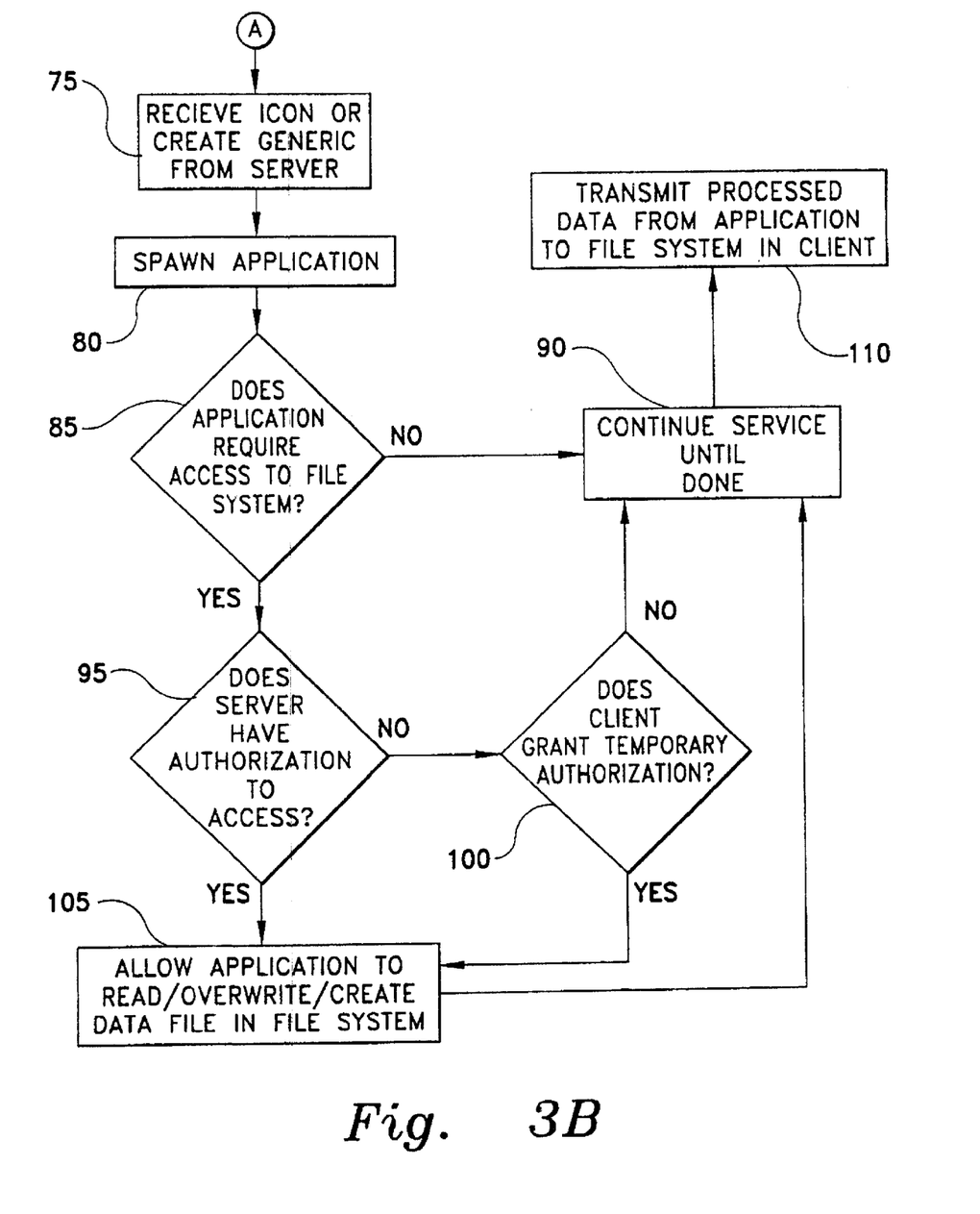

FIGS. 3A and 3B show a flow diagram providing the steps for accessing and spawning a server application from a remote client. At step 20, a client station is powered on which initializes the network, the user interface, and the file system modules from ROM. The network module initializes the communication interfaces, such as for an attached modem, ethernet, ATM, cable or fiber optic connection. Further, a multiple network interface may be available to the client, i.e., the client may use an ethernet system for the incarnate but a cable modem for the internet. Servers may be accessible simultaneously through all available interfaces. If one of the interfaces is a regular modem, then a telephone connection is made with the ISP to establish a connection. PPP, SLIP or other point-to-point transport protocols can be used. The user interface modules initialize the display, keyboard and the like. The file system module initializes the file system comprising the service application information (previously spawned applications, networks, servers and ports) and related program data stored on the client storage device.

At step 25, the client detects whether any new hardware is present. Such hardware includes any added peripheral devices discussed above. If any new hardware is detected, a corresponding device file is created in the file system for controlling the device at step 30. If no new hardware device is detected, the process precedes to step 35 where the client makes connections to all the servers and applications which have been stored in its resource configuration file/database.

At step 40, if the application location (i.e., server IP address and port) which the user wants to spawn was not previously stored in the configuration file, then the client user creates a new entry in the "config" file, at step 45, to include the server and application address (port). However, if the desired application entry is present in the resource configuration file, the client connects to the appropriate address to connect to the selected server, at step 50. If the configuration file is not present, then the client user has to enter the appropriate IP address and port by hand. Once entered, this information can be saved for future use in the configuration file.

At step 55, the server is authenticated against a trusted database. Simply put, the server may be authenticated by transmitting a predetermined data string. At step 60, if the authentication of the server fails, then the connection to the server will not be made, at step 65, and the process returns to step 35, where the client quasi-OS will try to connect to other servers/ports in the config file or the client user may select a different server application by hand after all the entries in the config file are exhausted.

At step 70, the client receives a public key from the server for encrypting the client's own private key and transmits the encrypted private key to the server. The server then decrypts the received encrypted private key with its own private key. Thereafter, all communication between the client and server are secured by using the client's private key. The client may generate a new key every time the client connects to a server or generate several new keys during a single connection for extra security. Special encryption hardware such as diodes could be used to generate random bit patterns to be used as the client's private keys.

At step 75, the server or a linked directory service application transmits graphical icons to the client representing the server's available applications. The client then dynamically builds a window containing each application icon. If, however, no icon is transmitted from the server (one is not available), then the client will generate a generic icon for selection purposes. At step 80, the client user will "click" the desired icon to spawn the corresponding application program. An application can also be started by "dragging" a data file and "dropping" onto the application icon. The client user may also directly access an application by typing in a unique service name at the command prompt, which is then looked up in the client's resource configuration file/database and the client then requests the directory service on the corresponding server that the respective application program is spawned.

At step 85, it is ascertained whether the server application requires access to any data client files in the client file system. For example, if the client connected to (spawned) a word processing application for editing, then the application would require the text data stored locally in the clients file system. If the application does not require any access to the client files, then the service continues, at step 90, until the user is done. During the service, the application may also control the client's peripheral devices via the quasi-OS, as previously discussed. The application normally receives the file names it needs to use from the client user as parameters or it is entered interactively by the client user after the application was spawned.

If the application does require access to the client files, it is ascertained whether the server application has the authorization to access such files (even if the client user entered the file name by hand, the authorization step is still required to prevent the server from changing the file name), at step 95. Such authorization can be set up previously by the client user as a "rule" based permission system to grant authorization to a specific server every time (or until the client changes the authorization) or to grant authorization per single use. A rule based restriction may be based on the data file type, the application, the server, the access requested and the date. In addition, access by a specific application may be restricted to only a specific set of files by name or directory. Thus, every time the client accesses the server application, the client user would have to re-authorize such access. Even if authorization is granted to a server, there are different authorizations which may be given to each server. For example, anyone or all of the following authorizations may be given: "read", "write", "append", and "create".

If the server does not have authorization to access the files in the resource configuration file, then the process proceeds to step 100 where the client user, as stated above, chooses whether or not to grant a single use authorization. If the client user does not grant authorization, then the process proceeds to step 90 where the service will continue until done or the server application may decide to terminate. If the client does grant temporary authorization or the server/application had a predetermined authorization, then the process proceeds to step 105 where the server application is permitted to read, write, append, rename, move, or create the corresponding file in the file system, as authorized by the client user. The client also has an ability to substitute one file for another. If the file requested by the application contains information which the client user does not want accessed, the user may substitute another file for it and the application will not know anything about the switch. This will allow the client to "remap" file names which have been hard-coded into applications.

During the service, the quasi-OS may react in 3 different ways to application's request to perform a particular operation: 1) it may perform the operation and notify the application of success, 2) it may not perform the operation and notify the application of failure, 3) it may not perform the operation but still notify the application of success. The third option would be useful to allow the remote application whose "commands" are either inappropriate or violate security to proceed without immediate failure.

From step 105, the process proceeds to step 90 where the spawned application will continue running until the client user is done. Lastly, at step 110, the processed data from the server application will be transmitted, if necessary, to an appropriate file in the client's file system. If the application was updating the data file as it ran, then the file would simply close.

While several embodiments have been chosen to illustrate the invention, it will be understood by those skilled in the art that various changes and modifications can be made herein without departing from the scope of the invention as defined in the appended claims.

What is claimed is:

1. A secured system for accessing application services from at least one application program, comprising:

at least one client station having low-level application independent logics stored therein and at least one controller for controlling said low-level application independent logics, said low-level application independent logics including a user interface logic, a device control logic for controlling devices, a file system logic, and a communication interface logic, wherein said file system logic includes a file system capable of storing data corresponding to said at least one application program;

at least one application server having high-level application logic stored in a server device for running said at least one application program, said server device being coupled to said at least one application server; and a low-level interface between said at least one client station and said at least one application server for connecting said at least one client station to said at least one application server, wherein upon accessing by said at least one client station, said at least one application server runs said at least one application program which selectively controls said low-level application independent logics for controlling devices of said at least one client station and for accessing data of said at least one client station, and wherein said at least one application server processes said corresponding data from said at least one client station on said at least one application program without permanently storing said data in a server device coupled to said at least one application server.

2. The system of claim 1, wherein said at least one client station lacks a general purpose central processing unit to prevent execution of application program code on said at least one client station, so as to decrease cost and protect said at least one client station.

3. The system of claim 1, wherein program code of said at least one application program remains on said at least one application server, so as to protect said at least one client station from data or internal state corruption by said at least one application server and to protect said program code of said at least one application program stored on said at least one application server.

4. The system of claim 1, wherein said at least one client station further includes a low-level quasi-operating system for supporting client station connections to said at least one application server, for controlling any peripheral devices attached to said at least one client station and for controlling said user interface logic, said device control logic, said file system logic, and said communication interface logic as commanded by said at least one application program running on said at least one application server, said quasi-operating system being permanently stored in a read-only-memory in said at least one client station such that said quasi-operating system is not alterable, wherein said quasi-operating system is able to restrict which functions, data, and devices can be used by said at least one application program running on said at least one application server, and is unable to load any executable code which is not part of said quasi-operating system.

5. The system of claim 4, wherein said user interface logic, controlled by said quasi-operating system, is graphical user interface logic.

6. The system of claim 1, wherein said at least one client station further comprises at least one storage device.

7. The system of claim 6, wherein said corresponding data is stored in a storage device of said at least one client station in a respective at least one data file of said file system, such that said at least one client station selectively restricts access by said at least one application server to said at least one data file to protect said at least one client station from data or internal state corruption by said at least one application server and to prevent access of said at least one data file by an application program which is not authorized to access said at least one data file.

8. The system of claim 7, wherein said at least one application server requests access to a predetermined data file but is granted access to another data file selected by said at least one client station.

9. The system of claim 7, wherein upon authorization by said at least one client station, said at least one application server may read, write, append, move, rename, perform low-level file control operations, and create said data files in the file system of said at least one client station.

10. The system of claim 1, wherein said at least one controller is a microprocessor for performing permanently fixed quasi-operating system functions and permanently fixed digital signal processing functions stored in said at least one client station, wherein said microprocessor is not able to load and execute application program code.

11. The system of claim 6, wherein said at least one controller is unable to access and logically control data stored in said storage device on behalf of said at least one application program running on said at least one application server without authorization from said at least one client station.

12. The system of claim 11, wherein denial of access and control of data is based on parameters selected from the group consisting of said at least one application program, said at least one application server, a date, a file name, a file type, and a directory.

13. The system of claim 1, wherein said low-level interface includes a fixed set of application independent functions callable from an application program running on said at least one application server to create and dispatch command packets according to operating system service interface protocol to said at least one client station, said command packets comprising a user interface protocol and a file system and device control protocol so that said at least one application server can control through application programs running on said at least one application server the functioning of said at least one client station and the processing of data from peripheral devices or storage devices coupled to said at least one client station.

14. The system of claim 1, wherein file systems or devices of at least two client stations are controlled and accessed by said at least one application server for processing data corresponding to said at least one application program with said at least one application program, wherein said at least one application program accesses data which corresponds to said at least one application program from at least one of said at least two client stations, processes data which corresponds to said at least one application program from at least one of said at least two client stations, and outputs said processed data to at least one of said at least two client stations, such that each client station may cooperate with each other and share data, files, and devices as permitted by each client station.

15. The system of claim 1, wherein said at least one application server further includes a file system having code of said at least one application program stored therein, and wherein said at least one client station is denied access to said file system of said at least one application server to protect said at least one application server from corruption by said at least one client station and to protect said code of said at least one application program stored on said at least one application server from corruption or copying by said at least one client station.

16. The system of claim 1, wherein said at least one application server is a computational server, such that said at least one application server loads code of said at least one application program from a separate file server or super-client to protect said code of said at least one application program from corruption by a running application program and wherein said at least one client station is denied access to said file server or super-client to protect said code of said at least one application program from being copied or corrupted by said at least one client station.

17. The system of claim 1, wherein said interface is connected over one of a local area network, a wide area network, and an interface bus.

18. The system of claim 1, wherein said at least one client station further includes at least one means for obtaining or outputting data external to said at least one client station.

19. The system of claim 18, wherein said at least one application program running on said at least one application server selectively accesses and logically controls said at least one means for obtaining or outputting data external to said at least one client station via said at least one controller of said at least one client station.

20. The system of claim 1, wherein said at least one client station and said at least one application server share a common transport protocol.

21. The system of claim 1, wherein address and security privilege settings of said at least one application program is stored in a configuration file or database within said file system coupled to said at least one client station, and wherein said at least one client station connects to said at least one application program in said configuration file to receive application program icon information and to access said application services.

22. The system of claim 1, wherein said at least one application server is capable of accessing multiple devices or file systems, each resident on a respective client station, when at least two client stations access said at least one application server to access said at least one application program, wherein said at least one accessed application server accesses said multiple devices or file systems to form a centralized device and file management system for controlling said multiple devices, said file systems, or configurations of said at least two client stations.

23. The system of claim 1, wherein said at least one client station has at least a low-level quasi-operating system for supporting client station connections to said at least one application server to run said at least one application program on said at least one application server, and for controlling any peripheral devices attached to said at least one client station, wherein said at least one application server runs at least one of software service application programs and hardwired service application programs.

24. The system of claim 23, wherein said hardwired service application programs are operational via ASIC chips or a combination of a software application program and ASIC chips.

25. The system of claim 1, wherein a conventional application program is written using specific operating system application programming interface function calls and is converted to a network application program that runs on said at least one application server, said at least one application server having an operating system different from or the same as the operating system for which said conventional application program was designed, and wherein said network application program is able to use operating system services on said at least one client station by utilizing operating system service interface protocol over said low-level interface that connects said at least one client station to said at least one application server.

26. The system of claim 25, further comprising conventional application program conversion means for substituting operating system function calls of said conventional application program with code for generating command packets using said operating system service interface communications protocol, without modifying application program code of said conventional application program, to convert said conventional application program to said network application program, wherein the command packets are transmitted to said at least one client station for controlling specific operating system or device operations of said at least one client station, and wherein said network application program runs within said at least one application server and accesses and controls said specific operating system or device operations of said at least one client station as required by said network application program.

27. The system of claim 26, wherein said at least one client station is unable to load and run a conventional application program and is able to interpret and selectively process or restrict processing of said command packets.

28. The system of claim 1, wherein said at least one application server is unable to connect to said at least one client station unless said at least one client station first connects to said at least one application server.

29. The system of claim 1, wherein said at least one application program is a directory service application program which provides said at least one client station with addresses of other application programs, and retrieves other application program icons for display by said at least one client station.

30. A method of accessing application services from at least one application program, comprising the steps of:

accessing at least one application server by at least one client station to connect to said at least one application program running on said at least one application server, wherein said at least one client station has low-level application independent logics stored therein and at least one controller for controlling said low-level application independent logics, said low-level application independent logics including a user interface logic, a device control logic for controlling devices, a file system logic, and a communication interface logic, wherein said file system logic includes a file system capable of storing data corresponding to said at least one application program, and wherein said at least one application server has high-level application logic stored in a server device coupled to said at least one application server, for running said at least one application program;

having said at least one application server selectively retrieve data corresponding to said at least one application program from said at least one client station upon authorization from said at least one client station;

processing the retrieved data on said at least one application program; and storing no retrieved data and storing no processed data within said at least one application server when said application services are complete.

31. The method of claim 30, further comprising the step of transmitting said processed data from said at least one application server to said at least one client station during said application services or when said application services are complete.

32. The method of claim 30, wherein said at least one client station lacks a general purpose processing unit and is unable to load and execute application program code, so as to decrease cost and to protect said at least one client station.

33. The method of claim 30, wherein application program code of said at least one application program remains on said at at least one application server and said at least one client station is denied access to said application program code, so as to protect said at least one client station from data or internal state corruption by said at least one application server and to protect said application program code stored on said at least one application server from corruption or copying by said at least one client station.

34. The method of claim 30, further comprising the steps of:

supporting client station connections to said at least one application server via a low-level quasi-operating system;

performing mutual authentication to protect data of said at least one client station from said at least one application program running on said at least one application server and to prevent said application services from being used by an unauthorized client station;

controlling any peripheral devices attached to said at least one client station via said low-level quasi-operating system; and controlling said low-level application independent logics of said at least one client station as commanded by said at least one application program running on said at least one application server via said low-level quasi-operating system, wherein said low-level quasi-operating system is permanently stored in a read-only-memory in said at least one client station, such that said low-level quasi-operating system is not alterable, and wherein said low-level quasi-operating system is able to restrict which functions, data, and devices within said client station can be used by said at least one application program running on said at least one application server, and wherein said low-level quasi-operating system is unable to load any executable code which is not part of said low-level quasi-operating system.

35. The method of claim 34, wherein said user interface logic, controlled by said low-level quasi-operating system, is graphical user interface logic.

36. The method of claim 30, wherein said at least one client station further comprises at least one storage device.

37. The method of claim 36, further comprising the step of storing said data corresponding to said at least one application program in one storage device of said at least one client station in a respective at least one data file of said file system, such that said at least one client station selectively restricts said access by said at least one application server to said at least one data file to protect said at least one client station from data or internal state corruption by said at least one application server and to prevent unauthorized access of said at least one data file by said at least one application server.

38. The method of claim 37, further comprising at least one of the following steps:

reading said at least one data file upon authorization by said at least one client station;

modifying said at least one data file upon authorization by said at least one client station;

appending said at least one data file upon authorization by said at least one client station;

deleting said at least one data file upon authorization by said at least one client station;

copying said at least one data file upon authorization by said at least one client station;

changing names of said at least one data file upon authorization by said at least one client station, creating new data files upon authorization by said at least one client station; and performing file control operations on said at least one data file upon authorization by said at least one client station.

39. The method of claim 36, wherein said at least one controller is unable to access and logically control data stored in said storage device on behalf of said at least one application program running on said at least one application server without authorization by said at least one client station.

40. The method of claim 39, wherein denial of access and control of data is based on parameters selected from the group consisting of said at least one application program, said at least one application server, a date, a file name, a file type, and a directory.

41. The method of claim 30, further comprising the steps of:

selectively and simultaneously accessing file systems and devices for data, corresponding to said at least one application program, of at least two client stations by said at least one application server;

accessing said data corresponding to said at least one application program from at least one of said at least two client stations;

processing said data corresponding to said at least one application program of at least one of said at least two client stations;

outputting said processed data to at least one of said at least two client stations;

such that each client station may cooperate with each other and under control of said at least one application program share data, file systems, and devices as permitted by each client station.

42. The method of claim 30, wherein said at least one application server further includes a file system having code of said at least one application program stored therein, and wherein said at least one client station is denied access to said file system of said at least one application server to protect said at least one application server from data or internal state corruption by said at least one client station and to protect code of said at least one application program stored on said at least one application server from being copied by said at least one client station and from being corrupted by said at least one client station.

43. The method of claim 30, further comprising the step of launching said at least one application program from a separate file server or super-client to run on said at least one application server, wherein said at least one application server is a computational server, and wherein said at least one client station is denied access to said file server or super-client.

44. The method of claim 30, wherein said steps of accessing and transmitting occur over one of a local area network, a wide area network, and an interface bus.

45. The method of claim 30, wherein said at least one client station further includes at least one means for obtaining or outputting data external to said at least one client station.

46. The method of claim 45, further comprising the step of having said at least one application server selectively access and logically control said at least one means for obtaining or outputting data external to said at least one client station.

47. The method of claim 46, wherein the step of having said at least one application server selectively access and logically control said at least one means for obtaining or outputting data external to said at least one client station occurs by said at least one application server accessing and controlling said at least one controller of said at least one client station.

48. The method of claim 30, wherein said at least one client station and said at least one application server share a common transport protocol.

49. The method of claim 30, further comprising the step of accessing multiple devices or file systems by said at least one application server, each coupled to a respective client station, to form a centralized device and file management system for controlling said multiple devices, said file systems, or configurations of said client stations, when at least two client stations access said at least one application server to access said at least one application program.

50. The method of claim 30, wherein said at least one client station has at least a low-level quasi-operating system which carries out the steps of:
   interacting with a user of said at least one client station as required to control security settings for resources of said at least one client station;
   interacting with a user and a configuration file of said at least one client station to determine selection of application programs and servers;
   interacting with said said low-level application independent logics of said at least one client station as required by application programs;
   supporting client station connections to said at least one application server to run said application programs of said at least one application server; and
   controlling any peripheral devices coupled to said at least one client station, wherein said at least one application server runs at least one of software service application programs and hardwired service application programs.

51. The method of claim 50, wherein said hardwired service application programs are operational via ASIC chips or a combination of a software application program and ASIC chips.

52. The method of claim 30, wherein said at least one application program is a conventional application program that has an application programming interface specific to a particular operating system and is converted to a network application program that communicates to a client station via an operating system service interface communications protocol by steps comprising:
   substituting operating system function calls of said conventional application program with code for generating command packets using said operating system service interface communications protocol, without modifying code of said conventional application program, to convert said conventional application program to said network application program;
   wherein said network application program is able to run within said at least one application server, and access and control specific operating system or device operations of said remote client station as required by said network application program.

53. The method of claim 52, wherein said client station is unable to load and run a conventional application program and is able to interpret and selectively process or restrict processing of said command packets.

54. The method of claim 30, wherein said at least one application server does not connect to said at least one client station unless said at least one client station first connects to said at least one application server.

55. The method of claim 30, further comprising the steps:
   having said at least one client station connect to a directory service application program;
   having said directory service application program provide said at least one client station with addresses of other application programs;
   retrieving other application program icons; and
   displaying said other application program icons on said at least one client station.

56. A secured system for managing devices and file systems of a plurality of client stations, comprising:
   at least one application server having high-level application logic stored within a server device coupled to said at least one application server for running at least one application program, and said at least one application server being capable of accessing multiple devices and file systems, each coupled to a respective client station, when each client station interfaces with said at least one application server to access said at least one application program;
   wherein each interfaced server selectively accesses said devices, said file systems or both to form a centralized device and file management system for controlling and accessing devices, file systems, states, or configurations of said client stations;
   wherein upon accessing by said client stations, said at least one application server runs at least one application program and selectively controls low-level application independent logics of said client stations for controlling devices of said client stations and for accessing data of said client stations and wherein said at least one application server processes said corresponding data from said client stations on said at least one application program without permanently storing said processed data in a server device coupled to said at least one application server.

57. A secured system for accessing application services from at least one service application, comprising:
   at least one client station having at least a low level quasi-operating system stored therein for supporting said at least one client station connections to at least one application server and low-level application independent logics stored therein, said low level quasi-operating system comprising low-level application independent logics including a user interface logic, a device control logic for controlling devices, a file system logic, and a communication interface logic, wherein said at least one application server runs said at least one service application which controls said low-level application independent logics stored within said at least one client station for controlling said quasi-operating system and devices of said at least one client station, wherein said at least one service application is one of software service applications and hardwired service applications.

58. The system of claim 57, wherein said hardwired service applications are operational via ASIC chips or a combination of a software application program and ASIC chips.

59. A method of converting a conventional application program which has application programming interface specific to a particular operating system to a network application program which communicates with a client station via an operating system service interface communications protocol, comprising the steps of:
   substituting operating system function calls of said conventional application program with code for generating command packets using said operating system service interface communications protocol, without modifying application code of said conventional application program, to convert said conventional application program to said network application program so that an application server is able to transport
   the command packets to said client station for controlling specific operating system or device operations of said client station,
   wherein said code which generates command packets has identical application programming interface to said operating system functions of said particular operating system; and wherein said network application program runs within an application server, accesses data of said client station, and controls specific operating system and device operations of said client station, when said client station connects to said network application program, as required by said network application program.

60. The method of claim 59, wherein said client station is unable to load and run a conventional application program and is able to interpret and selectively process or restrict processing of said command packets.

61. A system for converting a conventional application program which has an application programming interface specific to a particular operating system to a network application program which communicates with said client station via an operating system service interface communications protocol for causing execution of operating system functions to control specific operations of said particular operating system of said client station, comprising:

conventional application conversion means for substituting operating system function calls of said conventional application program with code which generates command packets using said operating system service interface communications protocol, without modifying code of said conventional application program, to convert said conventional application program to said network application program;

wherein said code which generates command packets has identical application programming interface to said operating system functions of said particular operating system;

wherein said command packets are transmitted to said client station for controlling specific operations of the particular operating system within said client station; and wherein said network application program runs within an application server and executes said code to create command packets and to transmit command packets to said client station for accessing and controlling said specific operating system or device operations of said client station and for retrieving needed data from said client station, as required by said network application program.

62. The system of claim 61, wherein said client station is unable to load and run a conventional application program and is able to interpret and selectively process or restrict processing of said command packets.

* * * * *